United States Patent [19]
Katoot

[11] Patent Number: 5,861,129
[45] Date of Patent: Jan. 19, 1999

[54] POLYMER OPTICAL FIBERS AND PROCESS FOR MANUFACTURE THEREOF

[76] Inventor: Mohammad W. Katoot, 1080 Laurian Park Dr., Roswell, Ga. 30075

[21] Appl. No.: 594,711

[22] Filed: Jan. 31, 1996

Related U.S. Application Data

[60] Provisional application No. 60/003,693 Sep. 13, 1995.
[51] Int. Cl.⁶ .......................... B32B 27/04; B32B 27/12
[52] U.S. Cl. .......................... 422/135; 422/136; 422/137; 422/138
[58] Field of Search ................... 422/135, 136, 422/137, 138

[56] References Cited

U.S. PATENT DOCUMENTS

| | | | |
|---|---|---|---|
| Re. 33,755 | 11/1991 | Downey et al. | |
| 3,248,180 | 4/1966 | Kilpatrick | 422/137 |
| 3,443,909 | 5/1969 | Goossens | 422/136 |
| 3,484,213 | 12/1969 | Dew, Jr. et al. | 422/137 |
| 3,528,782 | 9/1970 | Riggert et al. | 422/136 |
| 3,544,522 | 12/1970 | Hahn | 422/136 |
| 4,021,600 | 5/1977 | Anolick et al. | 422/136 |
| 4,210,567 | 7/1980 | Kosters | 260/31.8 |
| 4,505,543 | 3/1985 | Ueba et al. | 350/96.34 |
| 4,571,313 | 2/1986 | Allemand et al. | 264/1.5 |
| 4,734,263 | 3/1988 | Gerking et al. | 422/135 |
| 4,842,369 | 6/1989 | Teshima et al. | 350/96.34 |
| 4,889,408 | 12/1989 | Teshima et al. | 350/96.34 |
| 4,891,075 | 1/1990 | Dakubo | 136/257 |
| 4,893,897 | 1/1990 | Parker et al. | 350/96.34 |
| 4,919,513 | 4/1990 | Nakakuki et al. | 350/96.33 |
| 4,989,947 | 2/1991 | Sasaki et al. | 350/96.34 |
| 5,145,255 | 9/1992 | Shimada et al. | 366/329 |
| 5,217,518 | 6/1993 | Petisce | 65/10.1 |
| 5,225,166 | 7/1993 | Zarian et al. | 422/109 |
| 5,245,057 | 9/1993 | Shirtum | 549/517 |
| 5,286,457 | 2/1994 | Woodson et al. | 422/135 |
| 5,308,986 | 5/1994 | Walker | 250/370.11 |
| 5,312,471 | 5/1994 | Jung | 65/18.2 |
| 5,390,274 | 2/1995 | Toyoda et al. | 385/124 |
| 5,443,775 | 8/1995 | Brannon | 264/143 |
| 5,466,535 | 11/1995 | Higgins et al. | 428/483 |
| 5,470,539 | 11/1995 | Imamura et al. | 422/136 |
| 5,476,638 | 12/1995 | Sulzbach | 422/133 |
| 5,519,226 | 5/1996 | Copeland et al. | 250/390.11 |
| 5,599,507 | 2/1997 | Shaw et al. | 422/135 |
| 5,607,648 | 3/1997 | Carter et al. | 422/137 |

FOREIGN PATENT DOCUMENTS

| | | |
|---|---|---|
| 2018007 | 1/1990 | Japan . |
| 0588685 | 9/1980 | U.S.S.R. . |

OTHER PUBLICATIONS

"Graded Index Polymer Optical Fiber for Speed Data Communications", T. Ishigure, Applied Optics, vol. 33, No. 19; pp. 4261–4266, Jul. 1994.

"Polymer Synthesis", vol. 1, Second Edition, Sandler et al., Academic Press, 1992.

*Primary Examiner*—Nina Bhat
*Attorney, Agent, or Firm*—Jones & Askew, LLP

[57] ABSTRACT

An apparatus for making polymer fiber optical cable is described. In addition, the present invention provides dyes that can be added to conventional polymers and are capable of shifting the wavelength of light transmitted through the polymer. The polymer can be any shape including, but not limited to sheets, films or cable.

20 Claims, 3 Drawing Sheets

POLYMER OPTICAL FIBERS AND PROCESS FOR MANUFACTURE THEREOF

CROSS-REFERENCE TO RELATED APPLICATIONS

This patent application is a continuation-in-part of provisional U.S. patent application Ser. No. 60/003,693 filed on Sep. 13, 1995.

TECHNICAL FIELD

This invention relates to an improved polymer optical fiber and an process and apparatus for making the optical fiber. The invention includes a graded index polymer optical fiber and to a process for the manufacture of a graded index polymer optical fiber. The invention also includes an optical fiber or polymer that is capable of shifting the wavelength of the incoming electromagnetic radiation to another wavelength. This invention includes a method of chemical cleansing of radicals to produce high transparency polymers. It also includes a method by which polymer fibers can be made radiation hardened.

BACKGROUND OF THE INVENTION

Plastic or polymer optical fibers have been produced in the prior art over the past several decades. However, the prior art methods of producing the optical fibers have produced fibers that are relatively inefficient with regard to transmission efficiencies, especially when compared to glass optical fibers.

For example, for long-range optical communication a single-mode glass optical fiber has been widely used, because of its high transparency and high bandwidth. In contrast, for short-range communication, recently there has been considerable interests in the development of polymer optical fibers. In short-range communications (such as local area network systems, interconnections, the termination area of fiber to the home, and domestic passive optical network concepts), many junctions and connections of two optical fibers are necessary. In a single-mode fiber, the core diameter is approximately 5–10 $\mu$m, so when one connects two fibers, a slight amount of displacement, such as a few micrometers, causes a significant coupling loss. The polymer optical fiber is one of the promising possible solutions to this problem, because commercially available polymer optical fiber usually has a large diameter such as 1 mm. Therefore, low transmission loss and high bandwidth has been required for polymer optical fibers to be used as a short-distance communication media.

Most commercially available polymer optical fibers, however, have been of the step-index type. Therefore, even in short-range optical communication, the step-index polymer optical fibers will not be able to cover the whole bandwidth of the order of hundreds of megahertz that will be necessary in fast datalink or local area network systems in the near future, because the bandwidth of the step-index polymer optical fibers is only approximately 5 MHz km.

In contrast, graded-index polymer optical fiber is expected to have a much higher bandwidth than step-index polymer optical fibers, while maintaining a large diameter. Several reports of a graded-index polymer optical fiber have been made by Koike, et al. (e.g., Ishigure, T., "Graded-index polymer optical fiber for high-speed data communication" *Applied Optics* Vol. 33, No. 19 pgs. 4261–4266(1994)). However, the methods described in the Koike et al. papers are gel diffusion methods of producing graded index fibers and are cumbersome and expensive.

What is needed is a low cost and simple method of producing a graded index polymer optical fiber. The method should produce a low-loss and high-bandwidth graded index polymer optical fiber and should include control of the graded refractive index in the fiber. In addition, the method should be easily adaptable to current manufacturing techniques of extruding polymer optical fiber.

SUMMARY OF THE INVENTION

The present invention provides for a low-loss and high-bandwidth optical fiber cable that is low cost and simple to produce. The present invention also includes methods for producing a graded index optical fiber cable.

For graded index optical fiber cable, the method of the present invention includes beginning with a cylinder of a homogeneous cladding polymer. The cylinder of cladding is inserted into a reaction chamber that is capable of being heated and rotated along its longitudinal axis. For example, the cladding can be a preformed silicone oligomer i.e., $\alpha,\omega$-dichloropropyldimethylsiloxane which has a refractive index of 1.42.

A monomer mixture of, for example, the above cladding and excess bisphenol A polycarbonate with bisphenol A pyridine methylene chloride solution then added to the interior of the cladding either continuously or stepwise as the chamber is heated and rotated. Phosgene gas is also added continuously to the chamber as the preform rod is formed. As the copolymer polymerizes on the inner surface of the cladding the proportion of bisphenol A polycarbonate to dimethylsiloxane can be varied to provide a copolymer with gradually changing refractive index. As the copolymer builds up on the inner surface of the cladding, the amount of polydimethylsiloxane decreases and the amount of bisphenol A polycarbonate increases until the preform rod is filled in. The preform rod can then be removed from the reaction chamber and used in a conventional extrusion apparatus to manufacture optical fiber.

The present invention also includes a method for increasing the clarity of the final fiber by the addition of free radical scavengers such as dibutyl-1-phthalate at a concentration of approximately 0.5% by volume. Other free radical scavengers that can be added to the polymer in the process of producing the preform rod include, but are not limited to, propanol, cyclohexane and butylnitrile. Other agents that can be used to increase the clarity of the final fiber include, but are not limited to, a variety of low temperature glass transition small molecules, such as siloxane oligomers and different Lewis acids.

The resulting fibers can easily be bundled together and fused by placing the bundle in a container and applying a vacuum to the bundle. The temperature is then raised to the glass transition point of the cladding. The bundle is then allowed to cool. The process is desirably repeated four to five times resulting in a uniform bundle of fibers.

Finally, the present invention includes additives that can be added to any conventional optical fiber that are capable of very large wavelength shifts between the incoming and exiting radiation. For example, a benzene solution of the reaction product of piperonal, cyanoacetate, and piperidine as discussed in Examples III and IV and the compositions taught in Examples V, VI, and VII.

Accordingly, it is an object of the present invention to provide a graded index polymer fiber optical cable.

It is an object of the present invention to provide a low-loss and high-bandwidth graded index polymer fiber optical cable.

It is further an object of the present invention to provide a method of manufacturing a graded index polymer fiber optical cable.

It is further an object of the present invention to provide a method of manufacturing a fused bundle of graded index polymer fiber optical cable.

It is yet another object of the present invention to provide an optical polymer suitable for use as a film, gel or fiber optical cable that is capable of large shifts in wavelength between the incoming and exiting electromagnetic radiation.

It is another object of the present invention to provide a polymer fiber optic cable suitable for use in endoscopic instruments.

These and other objects, features and advantages of the present invention will become apparent after a review of the following detailed description of the disclosed embodiments.

DETAILED DESCRIPTION OF THE INVENTION

Figure 1:
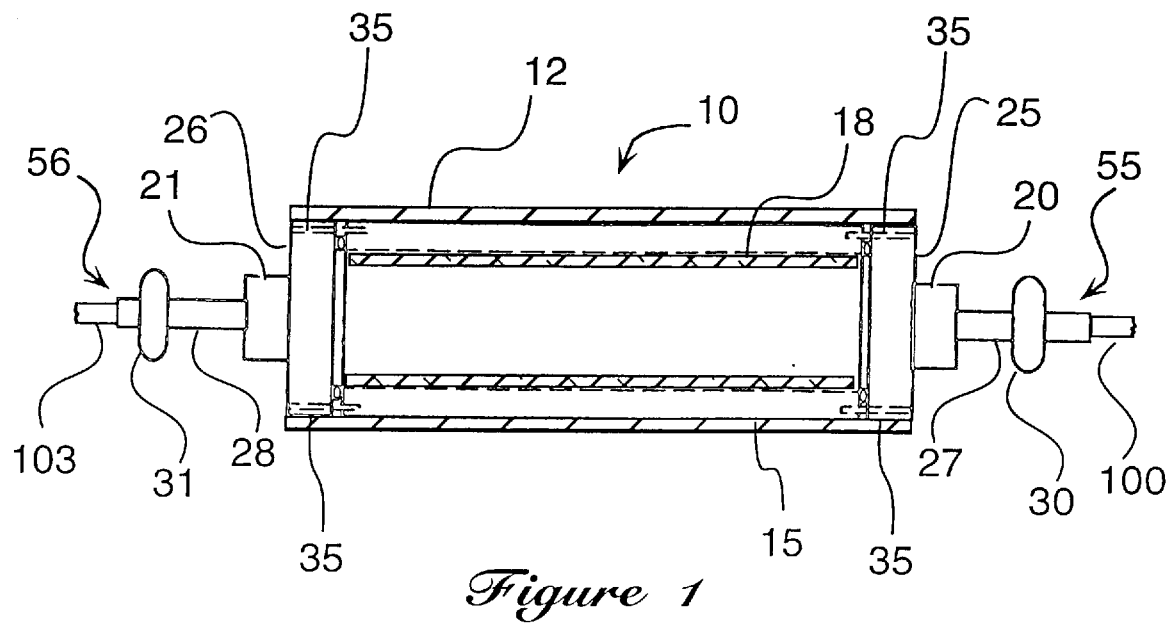
FIG. 1 is a cutaway side view of the rotating polymerization vessel.

The term "prepolymer composition" includes monomers and oligomers that can be used to make a polymer with desired physical characteristics. The term "preform rod" as used herein, means the polymer rod that is produced in the polymerization vessel according to the present invention. The term "wavelength shifting additive" as used herein, means any additive that is capable of adding the capability of a polymer to change the wavelength of electromagnetic radiation transmitted through the polymer. The wavelength shifting additive is preferably added to the prepolymer mixture before polymerization.

The present invention provides for a low-loss and high-bandwidth graded index optical fiber cable that is low cost and simple to produce. The present invention also includes a method of producing the graded index optical fiber cable. The present invention can be used to produce graded index optical fiber cable from a variety of monomers including, but not limited to, the monomers found in Table I.

TABLE I

| Monomer | $n_D$ of polymer |
|---|---|
| methyl methacrylate | 1.49 |
| ethyl methacrylate | 1.483 |
| n-propyl methacrylate | 1.484 |
| n-butyl methacrylate | 1.483 |
| n-hexyl methacrylate | 1.481 |
| isopropyl methacrylate | 1.473 |
| isobutyl methacrylate | 1.477 |
| tert-butyl methacrylate | 1.463 |

TABLE I-continued

| Monomer | $n_D$ of polymer |
|---|---|
| cyclohexyl methacrylate | 1.507 |
| benzyl methacrylate | 1.568 |
| phenyl methacrylate | 1.57 |
| 1-phenylethyl methacrylate | 1.549 |
| 2-phenylethyl methacrylate | 1.559 |
| furfuryl methacrylate | 1.538 |
| methyl acrylate | 1.4725 |
| ethyl acrylate | 1.4685 |
| n-butyl acrylate | 1.4634 |
| benzyl acrylate | 1.5584 |
| 2-chloroethyl acrylate | 1.52 |
| vinyl acetate | 1.47 |
| vinyl benzoate | 1.578 |
| vinyl phenylacetate | 1.567 |
| vinyl chloroacetate | 1.512 |
| acrylonitrile | 1.52 |
| α-methylacrylonitrile | 1.52 |
| methyl-α-chloroacrylate | 1.5172 |
| atropic acid, methyl ester | 1.560 |
| o-chlorostyrene | 1.6098 |
| p-fluoro styrene | 1.566 |
| o, p-difluoro styrene | 1.475 |
| p-isopropyl styrene | 1.554 |
| α,ω-dichloropropyldimethylsiloxane | 1.42 |

Prepolymer compositions which are useful in the practice of this invention, include such polymers as polycarbonates (such as those sold by General Electric Company under the trademark LEXAN), polyesters, polyolefins, acrylic polymers (such as those sold by Cyro Industries under the trademark ACRYLITE) and other thermoplastic polymers, particularly hydroxy phenyl terminated polycarbonates. Another example of a suitable acrylic polymer is polymethyl methacrylate. Other polymers include Cl terminated organosiloxanes silylamine terminated polydimethylsiloxanes, alkoxyfunctional siloxane with an alcoholic split, hydroxy terminated polymer borates, dihydric phenol with readily removable ammonia groups and diphenol propane bischloroformate.

The present invention is especially useful for producing graded index polymer optical fibers with specialized, non-linear graded index cross-sections. Additives can be incorporated into the graded index polymer optical fibers of the present invention to provide useful effects. For example, wavelength shifters can be added to shift wavelengths of electromagnetic radiation being transmitted through the fiber. By choosing the proper polymers, the flexibility of the graded index polymer optical fibers can be adapted to a particular use.

The present invention is also useful in producing single mode optical fibers that can be used for visual transmission of images. These fibers are particularly useful for endoscopic devices. By using the fibers according to the present invention, the optical fibers can replace expensive glass fibers with no reduction in the clarity of the transmitted image.

The process of administering the copolymer is adjusted so that the final polymer administered is bisphenol A polycarbonate or other phenols listed in the table which have a refractive index of 1.58. The resulting preform rod is a graded index rod with an index of 1.42 on the surface which gradually increases to 1.58 at the center of the preform rod. The rod can then be heat-drawn using conventional extrusion techniques to provide a graded index polymer optical fiber. It is important to note that, according to the present invention, the change in refractive index from the outer surface of the preform rod, and therefore the resulting optical fiber, can be linear, non-linear, or even stepped, depending upon the manner in which the to polymers are added to the cylinder. To produce a single mode optical fiber, a single concentration of a polymer or mixture of polymers is used in the synthesis of the preform rod. To produce a graded index optical fiber, two or more polymers are used.

Briefly, the present invention includes the formation of a graded index polymer on the inside surface of a tube of cladding polymer. The cladding polymer is a sufficiently lower refractive index than that of the core polymer. The refractive index of the cladding polymer is desirably up to 1.43, preferably up to 1.415. As the refractive index lowers, the maximum possible light incident angle increases. Additional properties necessary for the cladding polymer are high transparency, mechanical strength, heat resistance and adhesiveness to the core. In the graded index fiber, the cladding is the copolymer itself.

The refractive index gradient is formed by using two or more different monomers or oligomers and reacting those monomers or oligomers while varying the ratio of the concentration of the monomers or oligomers as the preformed rod is being formed. In this way, a smooth gradient is formed from the inner surface of the cladding to the center of the preformed rod. The preformed rod can then be heat drawn to form the fiber.

The monomers and all of the required reactants should be cleaned by the use of, for example, ultrafilters capable of removing fine particles having sizes of 100 Å or more. Monomers are cleaned in two consequent processes: first, monomers are washed with appropriate solvents (such as water) and then dry (nonaqueous) solvent. Then, the monomers can optionally be vacuum distilled before introduction into the polymerization chamber.

Turning now to the Figures in which like numbers represent like elements in each of the Figures, in FIG. 1 is shown a cross-sectional view of a polymerization vessel 10 with a heating jacket 12 surrounding the polymerization vessel 10. The heating jacket 12 can be any commercially available heating jacket, preferably heated by electricity. The polymerization vessel 10 is preferably a stainless steel cylinder 15 with a right end cap 25 and a left end cap 26. Each of the caps 25 and 26 has a threaded hex knot (shaft support) 20 and 21 respectively. Shafts 27 and 28 are inserted into caps 25 and 26 respectively. The right end cap 25 and the left end cap 26 each have a bearing and slip ring 30 and 31. The right end cap 25 and the left end cap 26 are attached to the stainless steel cylinder 15 by seal screws for end caps 25 and 26. In operation, an outer polymer cladding and polymer growth substrate 18 is inserted into the polymerization vessel 10 before polymerization of polymer.

Figure 2:
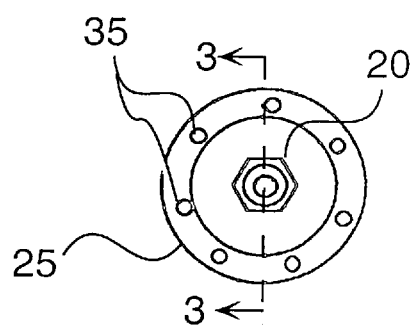
FIG. 2 is an end view of the polymerization vessel.
Figure 6:
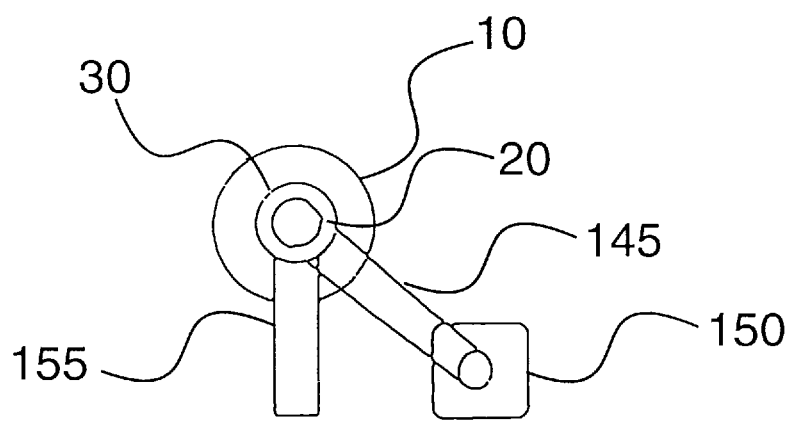
FIG. 6 is an end view of the polymerization vessel attached to a variable speed motor.

FIG. 2 shows an end view of polymerization vessel 10 showing slip ring 30 and shaft support 20. Also shown are the seal screws for the end caps 35. As shown in FIG. 6, the polymerization vessel 10 on support 155 can be rotated during the polymerization process by attaching a belt 145 to shaft 28 between threaded hex nut 20 and slip ring 30 and to a variable speed motor 150.

Figure 3:
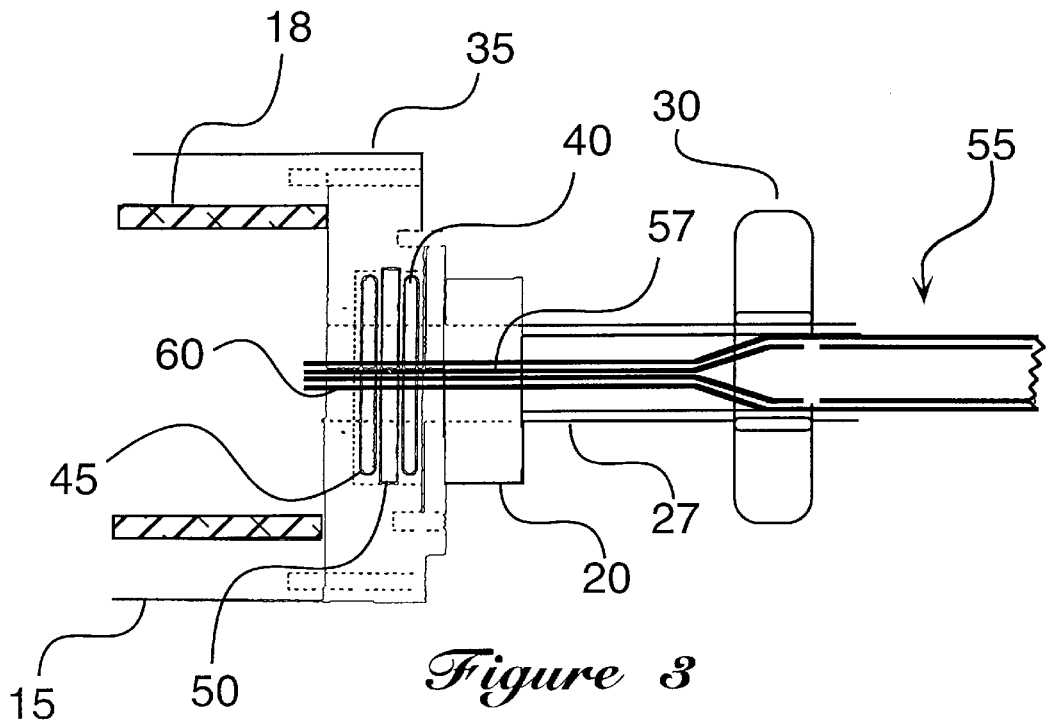
FIG. 3 is a cut-away view along line 3—3 of one end of the rotating polymerization vessel showing injection of reactants into the container.

FIG. 3 shows a cutaway view of the right end cap 25 of the polymerization vessel 10 cut along lines 3—3. FIG. 3 also shows right injection system 55 inserted into shaft 27 and shows bearing and slip ring 30, shaft 27, and right end cap 25. Also shown in recess 60 is a sealing disk for injection system 40 and 45 on either side of cylindrical spacer 50. The injection and outlet system 55 is inserted into shaft 27 with needle 57 inserted through sealing disk 40 and 45 and cylindrical spacer 50 through which prepolymer is injected into the polymerization vessel 10.

Figure 4:
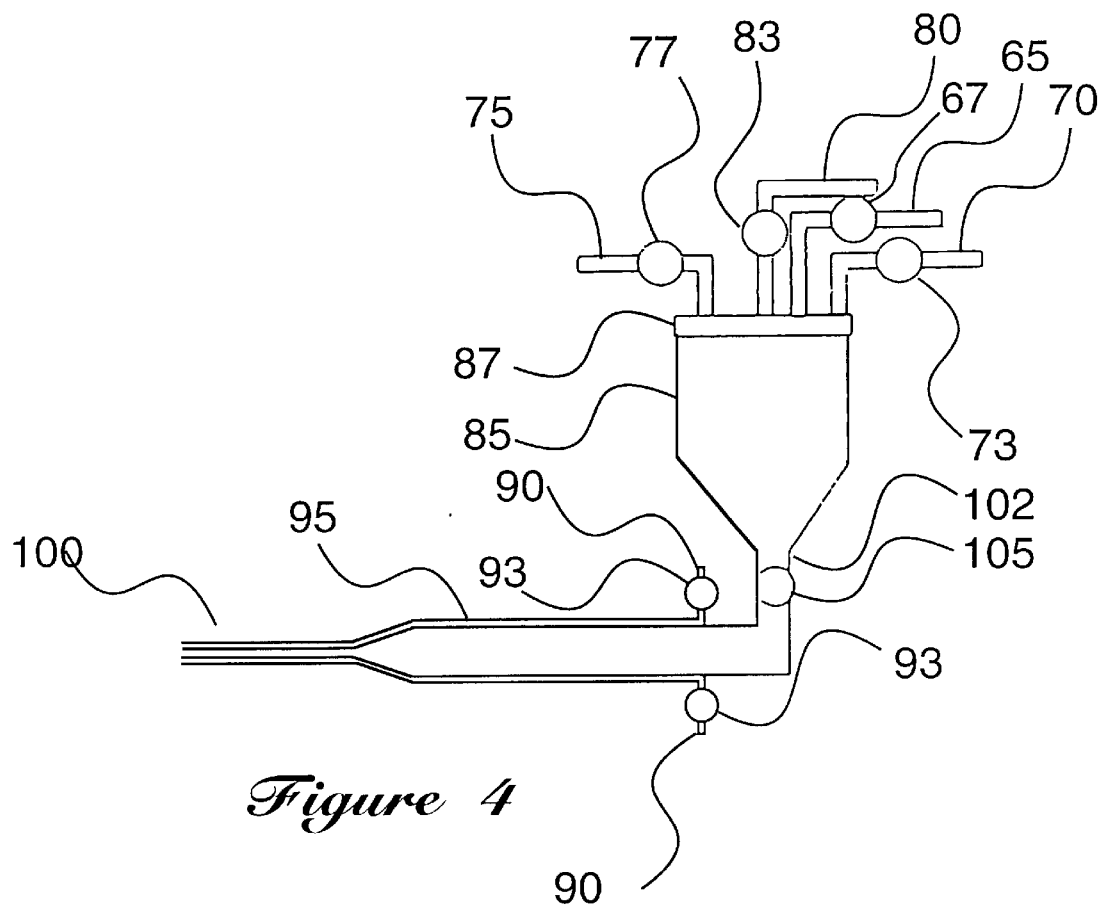
FIG. 4 is a schematic showing the injection and outlet system.

Turning now to FIG. 4 which shows the right injection and outlet system 55 in its entirety. The injection and outlet system 55 is comprised of a mixing vessel 85 with a sealed cap 87. Multiple inlet ports are inserted into sealed cap 87. In the embodiment shown in FIG. 4, there is an input to vacuum 65 with an input to vacuum valve 67. There is a first input port 70 with a first input valve 73. There is also a second input port 75 with second input valve 77. It is to be understood that in the present invention more than one input port can be inserted into the mixing vessel 85 depending on how many prepolymer compositions are to be introduced into the polymerization vessel 10. The mixing vessel 85 also has an input port from a distillation apparatus 80 and an input port valve from the distillation apparatus 83. In use, the distillation apparatus 80 may or may not be used. In addition, more than one distillation apparatus 80 may be attached to the mixing vessel 85. The mixing vessel 85 has a mixing vessel port 102 which opens to injection container 95 through mixing vessel port valve 105. The injection container opens to first injection port 100 which is inserted into shaft 27 or left shaft 28 during loading of the rotating polymerization vessel 10. The injection container has two outlet ports 90 and two outlet port valves 93. These outlet ports are used to remove gases from the polymerization vessel 10 as the polymerization vessel is loaded.

Figure 5:
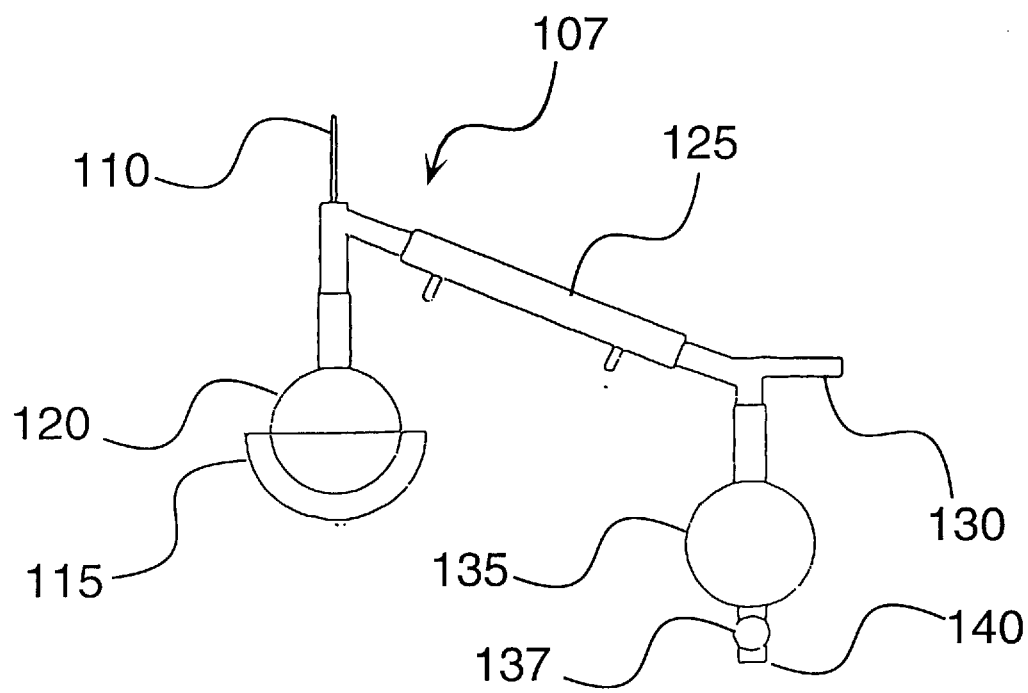
FIG. 5 is a schematic of the distillation system.

The distillation apparatus 107 is shown in FIG. 5 and comprises a distillation flask 120 that is set in heater 115. Distillation flask 120 has a thermometer 110 inserted in the top of the distillation flask 120. The distillation flask 120 is attached to a condenser 125 which is capable of being cooled either by water or other cooling fluid. The condenser 125 is connected to receiving flask 135 through a connector which has an outlet to vacuum 130. The receiving flask 135 has a port 140 to mixing vessel 85. The port 140 to mixing flask has a receiving flask valve 137 to control delivery of material to mixing vessel 85.

In preparing a preform rod, the outer polymer cladding and polymer growth substrate 18 is placed in the polymerization vessel 10 and the end caps 25 and 26 are attached to the polymerization vessel and sealed. The polymerization vessel 10 is heated to the desired temperature by heater 12. As shown in FIG. 6, the polymerization vessel 10 is rotated by turning on motor 150 to the desired speed.

The prepolymer compounds are then mixed in mixing vessel 85 by introducing the various prepolymer compounds via the input ports 70, 75, and 80 to the mixing vessel 85. Once the prepolymer compounds are delivered to the mixing vessel 85, they can be injected directly into the polymerization vessel 10 via the injection system 55. The polymerization vessel 10 is then heated to the desired temperature and the prepolymer mixture is injected into the polymerization vessel at the desired rate through the injection and outlet system 55. At the other end of the polymerization vessel 10, an initiator, such as phosgene, is added via left injection system 56 and injection port 103. This process continues until the polymer is formed filling the polymerization vessel 10. It is to be noted that the mixture of prepolymer compounds can be added at various rates thereby changing the ratio of the prepolymer components in the final polymer as the polymer is formed in the polymerization vessel 10. In this way, a graded index preform polymer can be easily produced and the ratio of the prepolymer compounds can be varied in any way to form a preformed polymer with the desired index changes from the cladding to the center of the preformed polymer.

After the preformed rod is formed, the rod is removed from the polymerization vessel 10 and can be extruded by means well known to those of ordinary skill in the art to form a polymer fiber.

The graded index polymer optical fibers of the present invention are particularly suited for short-distance communication applications such as local area networks (LANs), datalinks, and multinoded bus networks, because its easy processing and large diameter enable high efficiencies of fiber coupling and beam insertion. The graded index polymer optical fibers of the present invention have a much higher bandwidth (>500 MHz km) than that of a multimode step index polymer optical fibers (2–5 MHz • km).

The present invention also includes a method for increasing the clarity of the final fiber by the addition of free radical scavengers such as dibutyl-1-phthalate at a concentration of approximately 0.5% by volume. Other free radical scavengers that can be added to the polymer in the process of producing the preform rod include, but are not limited to, propanol, cyclohexane and butylnitrile. Other agents that can be used to increase the clarity of the final fiber include, but are not limited to, a variety of low temperature glass transition small molecules, such as siloxane oligomers and different Lewis acids. It is to be understood that the agents that can be used to increase the clarity of the final fiber can be used alone or in any combination. Desirably, the concentration of the clarity agent should between approximately 0.01 to 2% by weight with the more desirable concentration between approximately 0.1 to 1% by weight with the most desirable concentration of approximately 0.5% by weight.

The present invention also includes additives that are capable of shifting the wavelength of electromagnetic radiation as the radiation passes through a polymer containing the additives. The additives can be used in any polymer or polymer fiber. The additives are unique in that they are capable of producing very large shifts in radiation wavelength. For example, certain of the additives can shift the wavelength of the incoming electromagnetic radiation from the ultraviolet range to visible range. Another of the additives can shift infrared electromagnetic radiation to visible. Yet another of the additives is capable of shifting x-ray electromagnetic radiation to visible. The additives of the present invention are capable of shifting electromagnetic radiation over a wavelength range of 200 nm. For example, the additive described in Example IV is capable of shifting the wavelength of ultraviolet electromagnetic radiation at a wavelength of 250 nm to green light at a wavelength of approximately 420 nm.

Although not wanting to be bound by the following hypothesis, it is believed that the wavelength shift is due to an intramolecular proton shift. The additives are generally polymers that are in a "ladder" configuration with crosslinkers comprising aromatic moieties that are capable of donating and accepting protons when exposed to electromagnetic radiation. The shift of the protons causes a shift in the wavelength of the electromagnetic radiation.

The present invention can also be applied to a film for a variety of applications involving various kinds of imaging processes, all of which are considered within the scope of the present invention. Conventional radiographic procedures involve the passage of X-rays through an object to produce an image composed of white, black and various shades of grey depending on the radiodensity of the object. This image is usually captured on a film which is subsequently developed and fixed in film processing machines employing various chemicals. The present invention is very sensitive to electromagnetic radiation and can be employed with approximately 25% of the incident radiation normally required. A film coated with the present invention and exposed to X-rays produces a color image without the need to capture the image and convert it to color through intermediate means such as a computer. Using the present invention, a health care provider, for example, could easily obtain a color image of a damaged limb following exposure of the limb to X-rays. This color image could be obtained using only about 25% of the incident radiation normally required to produce a radiograph, thereby significantly decreasing direct and reflected radiation exposure to the patient and the health care professional. Reduced radiation levels also decrease the amount of lead shielding required, thereby reducing the weight of shielding screens and garments, and decreasing associated occupational injuries such as low back strain due to heavy lead aprons. Furthermore, this color image could be viewed soon after exposure to the X-rays, thereby decreasing time delays in processing films, reducing costs involved with the purchase of radiographic print development equipment and supplies, and reducing the cost of disposal of toxic chemicals associated with photographic development.

The coated film of the present invention is also useful in the imaging of fluorographic procedures. Various fluorographic procedures, such as mannofluorography, involve the continuous exposure of the subject to X-ray radiation, and produce a black and white image of the differential radiodensity of the subject. These images are often stored on a tape and viewed as a continuous image. In this procedure a radiocontrast material such as barium is observed as it moves within the subject. For example, after swallowing a bolus of barium, a health care provider may watch the barium travel from the mouth into the oropharynx, esophagus and stomach. Use of the present invention would provide an on-line color image of the subject while significantly reducing the radiation exposure of both the subject and the health care provider. This invention is useful in a variety of similar radiologic procedures including, but not limited to the following; upper and lower gastrointestinal series, arteriograms, pneumograms, intravenous pyelograms, lymphangiography, choleangiography, myelograms, and other procedures.

The use of this invention in other imaging procedures is also considered within the scope of this invention. These imaging procedures include any procedure wherein some form of electromagnetic radiation is applied to a subject, including but not limited to the following procedures, magnetic resonance imaging (MRI), computer assisted tomography (CRT or CAT), positron emission tomography (PET) and improvements thereof.

In addition to living subjects, other objects receiving the radiation exposure may be inanimate. At this time, security measures in airports include radiographic analysis of luggage, coats, bags, etc. Use of the films of the present invention would decrease the level of required incident radiation to approximately 25% of current levels thereby providing reduced radiotoxicity and decreasing shielding costs, while also providing on-line color images which might facilitate identification of suspicious articles.

The present invention may be applied to improvements in radiation surveillance equipment. For example, radiation badges are worn by many individuals, especially those involved in research laboratories, nuclear facilities, and in clinical settings such as radiology services. These badges must be developed to provide a post facto assessment of the degree of radiation exposure of an individual. Use of the present invention incorporated in a film badge would provide an immediate visible color indication of the extent of radiation exposure without the need for badge development. This capability is especially useful during procedures involving relatively high levels of radiation such as radioiodinations, or preparation of radioactive therapeutic formulations. Film badges incorporating the films of the present invention could be worn on the fingers, belt and lapel.

The films of the present invention could also be incorporated into suits for astronauts and nuclear industry workers who are exposed to high levels of radiation, and into the cockpits and windshields of airplanes which are exposed to high levels of radiation in the upper levels of the atmosphere. The films of the present invention may be incorporated into recreational clothing and equipment, including, but not limited to visors, caps, sunglasses, swim suits, umbrellas, blankets, and chairs so that individuals may accurately monitor their exposure to solar radiation, thereby decreasing the incidence of sunburns and various forms of skin cancer, especially melanoma, which have increased dramatically in recent years.

Another item of radiation detection equipment that may incorporate the present invention involves small pieces of film attached to filter paper for use in radiation surveillance wipe tests performed to determine if a radioactive spill has occurred. The present invention would eliminate the need for measuring the radioactivity of conventional pieces of filter paper in a gamma counter since the papers with attached film that become radioactive would instantly change color. This invention would save time and money in unnecessary counting of wipe tests in gamma counters, free gamma counters for use in assays, and provide instant results. The film of the present invention could also be incorporated into sheets of laboratory bench-top paper so that radioactive spills could be visualized immediately during a procedure such as a radioiodination, thereby alerting the individual to the danger so that corrective procedures may be initiated.

The films of the present invention may also be used in the separations sciences. The film can provide a color print of radiolabelled bands on gel used for separating molecules such as proteins and nucleoproteins, thereby indicating the location of various radiolabelled molecules and obviating the need for apposition of conventional photographic films and their development. The film may be used to monitor the passage of radiolabelled materials through chromatographic columns. This film may also provide a color print of bands on gels that contain ethidium bromide or other markers that are activated by electromagnetic radiation, such as ultraviolet radiation, and emit eletromagnetic radiation in the form of ultraviolet radiation. The sensitive films of the present invention permit the use of significantly lower amounts of toxic dyes such as ethidium bromide that are required to visualize bands upon UV exposure.

The present invention may also be incorporated in detection systems that measure radiation output, such as gamma counters, scintillation counters, and spectrophotometers.

The films of the present invention can also be used in applications involving imaging of radiation based phenomena such as radiation emitted from stars, nuclear facilities, nuclear storage facilities, nuclear test sites, from shipment canisters and containers for radionuclides. For example, incorporation of the film of the present invention into the canisters used to ship radionuclides might warn the user of the isotope before opening the canister and risking exposure to concentrated doses of radioactivity if there has been contamination of the canister. This application eliminates the need for time consuming radioactive surveillance "wipe tests".

This invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims. Unless otherwise indicated, all chemicals are obtained from Aldrich Chemical Company, Milwaukee, Wis.

EXAMPLE I

The method of producing the graded index optical fiber cable includes beginning with a cylinder of a homogeneous cladding that is comprised of a suitable copolymer. The cladding is then inserted into a tube chamber with a volume of 200 ml. The chamber is capable of being heated and rotated along its longitudinal axis. (See FIG. 1) For example, the cladding can be $\alpha,\omega$-dichloropropyldimethylsiloxane which has a refractive index of approximately 1.42.

A monomer mixture of dimethylsiloxane and bisphenol A polycarbonate with bisphenol A pyridine methylene chloride and phosgene gas (carbonic dichloride) is then continuously added to the interior of the cladding as the chamber is heated and rotated. The polymers are added at a rate of approximately 5 ml/second. The phosgene gas is added continuously at a rate of approximately 1 ml/second. During the addition of the reactants, the chamber is heated to a temperature of approximately 100° C. The chamber is rotated at a rate of approximately 12 to 30 revolutions per minute.

The reactants can be added through the side of the tube or preferably through the end of the tube through a membrane such as a Teflon membrane. (See FIG. 3) As the copolymer polymerizes on the inner surface of the cladding the ratio of bisphenol A polycarbonate to dimethylsiloxane can be varied to provide a copolymer with gradually changing refractive index.

As the copolymer builds up on the inner surface of the cladding, the amount of polydimethylsiloxane decreases and the amount of bisphenol A polycarbonate increases until the preform rod is filled in. The process of administering the copolymer is adjusted so that the final polymer administered is bisphenol A polycarbonate which has a refractive index of 1.58. The resulting preform rod is a graded index rod with an index of 1.42 on the surface which gradually increases to 1.58 at the center of the preform rod. The rod can then be heat-drawn using conventional extrusion techniques to provide a graded index polymer optical fiber.

EXAMPLE II

The clarity of the graded index optical fiber prepared according to Examples I and II is increased by the addition of the free radical scavengers dibutyl-1-phthalate at a concentration of approximately 0.5% by volume to the premix before injection into the reaction chamber.

The resulting fibers can easily be bundled together and fused by placing the bundle in a container and applying a vacuum to the bundle. The temperature is then raised to the glass transition point of the cladding. The bundle is then allowed to cool. The process is desirably repeated four to five times resulting in a uniform bundle of fibers.

EXAMPLE III

A wavelength shifting composition is prepared by the following protocol. Five grams of piperonal and five grams of cyanoacetate are mixed with 0.8 mls of piperidine. The mixture is then dissolved in 100 ml of toluene. Five grams of molecular sieves (Aldrich) is added to the solution. The mixture is heated at 70° C. for six hours. The mixture is then filtered through filter paper to remove the molecular sieve. The mixture is then cooled and the toluene is removed by evaporation to yield a powder. The powder can be dissolved in benzene at a concentration of 1 g/ml. The concentration of powder in the benzene can vary depending upon the amount of wavelength shifter needed in the final polymer matrix.

Various amounts of the benzene solution are added to a conventional methyl methacrylate prepolymer and the solution is polymerized according to conventional reaction protocols well known to those of ordinary skill in the art. (See, for example, "Polymer Synthesis", Vol. 1, Second Edition, Sandler et al., Academic Press, 1992) The amount of benzene solution can vary depending upon the fluorescence magnitudes needed. The resulting polymer is drawn into fiber by conventional means. The resulting polymer fiber is capable of shifting the wavelength of the electromagnetic radiation from approximately 250 nm to 420 nm.

EXAMPLE IV

A wavelength shifting composition which has a more narrow shift is prepared according to the protocol in Example III except that 7 g of piperonal was used in the starting step. The resulting polymer fiber is capable of shifting the wavelength of the electromagnetic radiation from 250 nm to 400 nm.

EXAMPLE V

A second wavelength shifting composition capable of shifting ultraviolet electromagnetic radiation to visible light is prepared by the following protocol. 0.5 g of 4-4'-methoxy biphenyl piperidine-N-oxide is dissolved in 40 ml of tetrahydrofuran (THF). 0.25 µl of 2.1 mmole ethyl chloroformate is stirred vigorously into the solution at 20° C. for 20 minutes. After the polymerization step, the solution is cooled to −50° C. 19 mls of a 2.28 mM (in THF) anisyl magnesium bromide solution is added to above. The solution is maintained at −50° C. and stirred for 5 minutes and then is cooled to −70° C. for 30 minutes. The solution is then warmed gradually to 20° C. The solution is titrated slowly with 5 mls of methanol. The resulting mixture is filtered and the retained yellow powder is dried by evaporation.

A solution is prepared by dissolving 10 g of methoxymethyl p-tolyl ether in 20 mls of THF. The solution is cooled to −60° C. About 2.8 to 3.0 mls of 2 mM n-butyllithium in hexane (5 ml) is added to the solution and mixed for 30 minutes. The solution is gradually warmed to room temperature and is purged with nitrogen. 1.3 g of $MgBr_2$ is added to the solution and stirred for ½ hour. Then 190 mg of the yellow powder is added to the methoxymethyl p-tolyl ether solution and is heated to 25° C. for two hours. This solution is then added to conventional fiber optic polymers and fiber optic cable is prepared. The resulting fiber optic cable is capable of shifting the wavelength of ultraviolet light to visible light.

EXAMPLE VI

An additive that can be added to polymethylmethacrylate sheets, films or gels is prepared by mixing 20 ml of distilled 3-bromomethyl thiophene with 5 g of methoxy ethanol ethoxide. To this mixture 1 g CuO in 5 ml of 10% KI in ethanol is added. The solution is stirred at 110° C. for 3 hours. The resulting solution is filtered and dried under vacuum. The resulting powder is then added to conventional methyl methacrylate and initiators to produce a plastic sheet with a thickness of 100 µm to 2 mm. The plastic sheet is capable of shifting a wavelength from 250 nm to 400 nm.

EXAMPLE VII

Add 1 mole of OH-terminated biphenol polycarbonate to 1.05–2 moles of Cl-terminated siloxane in THF with different tertiary amines. It also can be polymerized by adding the latter to OH-terminated polycarbonates with alkoxyfunctional siloxanes with alcoholic splitting.

Other reagents can be used by replacing pyridine in the initial reaction of the halide terminated organosiloxane and dihydric phenol with readily and completely removeable ammonia.

To increase flexibility (for a rubber-like fiber optics guide), polymerize as before diphenylolpropane bischlorobromate with Cl-terminated organosiloxane.

EXAMPLE VIII

Method of making a frequency shifter of 200 nm to 700 nm.

Add 1.0 g, 2.59 mMoles dialdehyde and 1.82 g, at 2.6 mMole bis(phosphylidene) to 25 ml of 0.5 g Li Cl in DMF. Using a syringe, add dropwise 15 ml of a 1M potassium tert-butoxide solution in THF. After 6 hours of stirring, add 25 ml of 5% aqueous HCl; dry under reduced pressure. Dissolve the dried powder in chloroform and wash twice in 2% HCl and then 4 times in pure water and dry in a dessicator and the precipitate in absolute EtOH.

This copolymer changes the linkage links. The side chain position can be changed by varying the amount of the dialdehyde and by adding small amounts of terphahalaldehydes to the first solution.

It should be understood, of course, that the foregoing relates only to preferred embodiments of the present invention and that numerous modifications or alterations may be made therein without departing from the spirit and the scope of the invention.

I claim:

1. An apparatus for making a preform polymer rod comprising:
   a polymerization vessel which is rotatable along its longitudinal axis;
   a means for introducing prepolymer compositions into the polymerization vessel;
   a means for heating the polymerization vessel; and
   a means for rotating the polymerization vessel along its longitudinal axis; wherein the apparatus does not contain stirring or conveying means within the polymerization vessel; and wherein the preform polymer rod is removable from the polymerization vessel.

2. The apparatus of claim 1, wherein the apparatus further comprises a means for introducing an initiator into the polymerization vessel during the polymerization of the prepolymer compositions.

3. The apparatus of claim 1, wherein the means for rotating the polymerization vessel rotates the polymerization vessel along its longitudinal axis at variable speeds.

4. The apparatus of claim 1, wherein the means for introducing prepolymer compositions introduces the prepolymer compositions at varying ratios.

5. The apparatus of claim 4, wherein the means for introducing prepolymer compositions comprises a means for mixing the prepolymer compositions before introducing the prepolymer compositions into the polymerization vessel.

6. The apparatus of claim 1, wherein the polymerization vessel further comprises an input means whereby the prepolymer compositions can be introduced into the polymerization vessel during polymerization.

7. The apparatus of claim 6, wherein the input means comprises a sealing disk.

8. The apparatus of claim 1, wherein the means for introducing prepolymer compositions comprises a means for removing gases from the polymerization vessel as the prepolymer compositions are introduced into the polymerization vessel.

9. An apparatus for making a preform polymer rod comprising:
   a polymerization vessel which is rotatable along its longitudinal axis;
   a means for introducing prepolymer compositions into the polymerization vessel;
   a means for heating the polymerization vessel; and
   a means for rotating the polymerization vessel along its longitudinal axis, wherein the polymerization vessel further contains an outer polymer cladding.

10. An apparatus for making a graded index preform polymer rod comprising:
    a polymerization vessel comprising a chamber in which the graded index preform polymer rod is made;
    a polymer cladding inserted into the chamber of the polymerization vessel;
    means for heating the polymerization vessel and the chamber;
    means for rotating the polymerization vessel and the chamber along their longitudinal axes; and
    means for introducing prepolymer compositions into the chamber, wherein the means for introducing introduces the prepolymer compositions at varying ratios during polymerization.

11. The apparatus of claim 10, wherein the apparatus further comprises a means for introducing an initiator into the chamber during the polymerization of the prepolymer compositions.

12. The apparatus of claim 10, wherein the polymerization vessel comprises a shaft support attached to the polymerization vessel; and
    the means for rotating the polymerization vessel comprises a variable speed motor attached to the shaft support.

13. The apparatus of claim 10, wherein the means for introducing prepolymer compositions comprises:

a mixing vessel;
a first input port and a first input valve for introducing a first prepolymer composition into the mixing vessel;
a second input port and a second input valve for introducing a second prepolymer composition into the mixing vessel; and
an injection port for introducing the first and the second prepolymer compositions into the chamber.

14. The apparatus of claim 10, wherein the polymer cladding is the outer surface of the graded index preform polymer rod.

15. The apparatus of claim 14, wherein the polymer cladding has a lower refractive index than the refractive index of prepolymer compositions.

16. The apparatus of claim 15, wherein the polymer cladding comprises $\alpha,\omega$-dichloropropyldimethylsiloxane.

17. An apparatus for making a graded index preform polymer rod comprising:
    a cylindrical polymerization vessel comprising a chamber in which the graded index preform polymer rod is made, wherein the vessel and the chamber rotate along their longitudinal axes; and
    a means for rotating the vessel and the chamber along their longitudinal axes; wherein the apparatus does not contain stirring or conveying means within the polymerization vessel; and wherein the preform polymer rod is removable from the polymerization vessel.

18. An apparatus for making a graded index preform polymer rod comprising:
    a cylindrical polymerization vessel comprising a tube chamber in which the graded index preform polymer rod is made, wherein the tube chamber rotates along its longitudinal axis;
    means for heating the tube chamber; and
    means for rotating the tube chamber along its longitudinal axis; wherein the apparatus does not contain stirring or conveying means within the polymerization vessel; and wherein the preform polymer rod is removable from the polymerization vessel.

19. The apparatus of claim 18, further comprising a cylinder of polymer cladding inserted in the tube chamber.

20. The apparatus of claim 19, wherein the cylinder of polymer cladding has a different refractive index than the refractive index of the interior of the graded index preform polymer rod.

* * * * *